3,016,382
N-SUBSTITUTED ANILIDES AND METHOD OF PREPARING THE SAME
William B. Wright, Jr., Woodcliff Lake, N.J., and Herbert J. Brabander, Pearl River, N.Y., assignors to American Cyanamid Company, New York, N.Y., a corporation of Maine
No Drawing. Filed Dec. 15, 1958, Ser. No. 780,187
9 Claims. (Cl. 260—294)

This invention relates to new organic compounds. More particularly, it relates to substituted alkylene diamines and methods of preparing the same.

In the past, numerous substituted ethylene diamines have been prepared. For example, Chemical Abstracts, 43, 593C, describes N-(3-diethylaminopropyl)-formanilide. This compound and closely related compounds described in the prior art are inactive as analgesics when tested as hereinafter described.

This application is a continuation-in-part of our application Serial No. 630,760, filed December 27, 1956, now abandoned.

We have found that compounds having the following structure are in general active as analgesics:

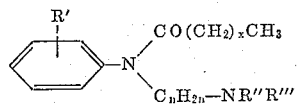

in which X is an integer of 1 to 3, R' is hydrogen, halogen, dihalogen, hydroxyl, lower alkyl, lower alkoxy, lower alkanoyloxy, amino, or lower alkanoylamino, NR"R''' is diloweralkylamino, N-(lower alkyl)-allylamino, morpholino, methylpiperazino, or a saturated heterocyclic ring wherein R" and R''' taken together form a divalent saturated hydrocarbon radical; and $n$ is an integer from 2 to 4.

The present compounds will form acid addition salts, which are generaly crystalline solids, as shown in the examples hereinafter.

The compounds of the present invention are, in general, liquids at room temperature, which are relatively insoluble in water but soluble in most organic solvents. They form salts with mineral acids which are soluble in water and alcohol but relatively insoluble in ether.

The present compounds can be prepared by several different methods. A convenient method is by the acylation of the substituted ethylene diamine with an acylanhydride or acylhalide. When the acylating agent is a liquid, the reaction can be carried out by heating with the substituted ethylenediamine. The reaction can be carried out, for example, by heating on a steam bath for 1 to 6 hours.

The compounds of the present invention can also be prepared by reacting a substituted acylanilide with a di-lower alkylamino alkylene chloride.

The following tables summarize the compounds of the present invention prepared by the examples described hereinafter.

TABLE I

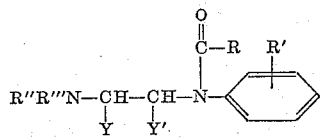

| R"R'''N | R' | Y | Y' | R | B.P. ° C. | Mono HCl M.P. ° C. | Procedure of Example |
|---|---|---|---|---|---|---|---|
| Dimethylamino | H | H | H | Ethyl | 115–118/1.8 | 138–141 | 1 |
| Do | H | H | H | Propyl | 110–115/0.3 | 132–133 | 4 |
| Do | H | H | Methyl | Ethyl | 117–122/0.2 | | 1 |
| Do | H | Methyl | H | do | 115–120/0.1 | | 1 |
| Do | p-Methyl | H | H | do | 118–123/0.6 | 144–145 | 1 |
| Do | do | H | H | Isopropyl | 112–115/0.1 | 179–180 | 5 |
| Do | p-Ethyl | H | Methyl | Ethyl | 120–124/0.2 | 184–185 | 1 |
| Do | m-Chloro | H | H | do | 142–144/2.5 | 125–127 | 1 |
| Do | do | H | Methyl | do | 120–122/0.7 | 146–148 | 1 |
| Do | do | H | do | Propyl | 125–127/0.7 | 183–184 | 4 |
| Do | m-Hydroxy | H | do | Ethyl | 170–190/0.8 | | 3 |
| Do | do | H | do | Propyl | 180–190/0.8 | | 3 |
| Do | n-Propionoxy | H | do | Ethyl | 150–154/0.8 | | 1 |
| Do | p-Amino | H | H | do | 160–165/0.2 | 203–205 | 2 |
| Do | p-Propionamido | H | H | do | 215–220/0.2 | 169–172 | 1 |
| Do | H | H | H | do | 130–133/1.5 | | 1 |
| Do | H | H | H | Propyl | 135–137/1.8 | | 4 |
| Do | H | H | H | Isopropyl | 105–110/0.8 | | 5 |
| Do | H | H | H | Butyl | 142–146/1.5 | | 6 |
| Do | o-Methyl | H | H | Ethyl | 116–120/0.2 | | 1 |
| Do | m-Chloro | H | H | do | 140–144/0.9 | | 1 |
| Do | do | H | H | Propyl | 144–148(0.8) | | 4 |
| Do | do | H | H | Isopropyl | 118–124(0.2) | | 5 |
| Do | do | H | H | Butyl | 148–152/0.5 | | 6 |
| Do | p-Chloro | H | H | Ethyl | 140–142/0.5 | | 1 |
| Do | 2,4-dichloro | H | H | do | 138–144/0.2–0.5 | | 1 |
| Do | m-Bromo | H | H | do | 138–142/0.3 | | 1 |
| Do | m-Methoxy | H | H | do | 152–156/1.0 | | 1 |
| Do | do | H | H | Propyl | 148–151/0.8 | 82–84 | 4 |
| Do | p-Ethoxy | H | H | Ethyl | 144–148/0.3 | | 1 |
| Do | m-Propionoxy | H | H | do | 146–152/0.3 | | 1 |
| Do | H | H | Methyl | do | 115–118/0.2 | 160–162 | 1 |
| Do | H | H | do | Propyl | 110–112/0.2 | 146–148 | 4 |
| Do | H | H | do | Isopropyl | 95–100/0.2 | 164–166 | 5 |
| Do | H | H | Methyl | Ethyl | 116–120/0.3 | | 1 |
| Dibutylamino | H | H | H | Ethyl | 132–134/0.3 | | 1 |
| Do | H | H | Methyl | do | 150–154/0.7 | | 1 |
| Do | m-Chloro | H | H | do | 140–144/0.3 | | 1 |
| Piperidono | H | H | H | do | 150–152/1.0 | 125–127 | 1 |
| Do | H | H | Methyl | do | 142–152/2.3 | 201–202 | 1 |
| Do | H | H | do | Propyl | 116–120/0.1 | 180–181 | 4 |
| Do | H | H | do | Isopropyl | 110–115/0.2 | 167–169 | 5 |
| Do | H | H | do | Butyl | 140–145/0.8 | 164–165 | 6 |
| Do | H | Methyl | H | Ethyl | 128–134/0.8 | | 1 |
| Do | H | do | H | Propyl | 148–152/0.5 | | 4 |

TABLE I—Continued

| R″R‴N | R′ | Y | Y′ | R | B.P. °C. | Mono HCl M.P. °C. | Procedure of Example |
|---|---|---|---|---|---|---|---|
| Piperidono | H | H | H | Ethyl | 138–142/0.4 | 204–205 | 1 |
| Do | m-Chloro | H | H | do | 148–152/0.5 | | 1 |
| Do | do | H | Methyl | do | 146–150/0.4 | | 1 |
| Do | m-Methoxy | H | do | do | 140–144/0.3 | 193–194 | 1 |
| Do | do | Methyl | H | do | 168–172/0.2 | 124–127 | 1 |
| Do | m-Hydroxy | do | H | do | 210–215/0.1 | | 3 |
| Do | m-Propionoxy | H | Methyl | do | 155–160/0.2 | | 1 |
| Do | do | Methyl | H | do | 175–180/0.1 | | 1 |
| Do | o-Methyl | H | Methyl | do | 136–140/0.05 | 171–173 | 1 |
| Morpholino | H | H | H | do | 154–160/0.8 | | 1 |
| Do | H | H | Methyl | do | 144–148/0.7 | 189–190 | 1 |
| Do | H | Methyl | H | do | 146–150/0.3 | 156–158 | 1 |
| Do | m-Chloro | H | H | do | 154–160/0.2 | 189–191 | 1 |
| Pyrrolidino | H | H | H | do | 132–136/0.5 | 128–130 | 1 |
| Do | H | H | H | do | 122–126/0.4 | 197–198 | 1 |
| Do | H | H | Methyl | do | 124–128/0.3 | 168–170 | 4 |
| Do | m-Chloro | H | H | Propyl | 146–150/0.7 | 129–131 | 1 |
| Hexamethyleneimino | H | H | Methyl | Ethyl | 146–148/0.3 | 187–188 | 1 |
| 4-methylpiperazinyl | H | H | do | do | 140–145/0.05 | | 1 |
| Do | H | Methyl | H | do | 150–153/0.1 | | 1 |

TABLE II

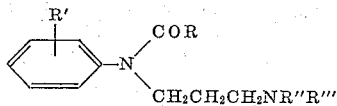

| NR″R‴ | R′ | R | B.P. °C. | Mono HCl M.P. °C. | Procedure of Example |
|---|---|---|---|---|---|
| Dimethylamino | H | $C_2H_5$ | 121–124/0.6 | 170–172 | 1 |
| Do | H | $C_3H_7$ | 117–122/0.1 | 160–161 | 1 |
| Do | m-Chloro | $C_2H_5$ | 130–134/0.2 | | 1 |
| Diethylamino | H | $C_2H_5$ | 145–150/2 | 153–154 | 1 |
| Piperidino | H | $C_2H_5$ | 140–145/0.3 | 197–199 | 1 |

The compound N-(1-methyl-2-piperidinoethyl)-propionanilide was found to be highly active as an analgesic agent. We have also found that if the racemic mixture is resolved into its optically active enantiomorphs, the levo-form contains substantially all of the analgesic activity. Furthermore, the levo-form enables preparation of a product of high analgesic activity without increased toxicity and thus increases the therapeutic range of the product. The levo-form of N-(1-methyl-2-piperidinoethyl)-propionanilide is ordinarily used in the form of water-soluble salts, derived from inorganic or organic acids, and anions of which are non-toxic and otherwise innocuous at the dosage levels required for therapeutic results. Salts which are useful can be obtained, for example by reacting the enantiomorph with hydrochloric acid, hydrobromic acid, sulfuric acid, citric acid, tartaric acid and the like.

The dextro-form of N-(1-methyl-2-piperidinoethyl)-propionanilide has antitussive activity and is, therefore, useful as an active ingredient of cough mixtures. The (d) and (l) forms individually, therefore, possess useful properties which are less pronounced in the mixture.

In carrying out the resolution, the racemic compound is dissolved in ethanol, a solution of l-malic acid in ethanol is added and the mixture cooled. The l-propionanilide-l-malate crystallizes preferentially and after filtration is further purified by recrystallization. The pure product can be converted into other salts such as the hydrochloride as shown hereinafter in the examples.

The mother liquor from the initial filtration of the l-propionanilide-l-malate is concentrated, treated with alkali, extracted with ether and the ether extract treated with d-tartaric acid to produce the d-propionanilide-d-tartrate. The product can be further purified by recrystallization from alcohol. Other salts can be prepared, for example, by treatment with alkali, extraction with a solvent such as ether, and subsequent treatment with acid to produce an acid salt.

The present compounds are active analgesics when measured by the mouse hot plate method described by Wolfe and McDonald (J. Pharmacol. Exptl. Therap., 80, 300–307) with modifications.

Compounds are suspended in 2% aqueous starch and administered subcutaneously to a group of three mice at a dosage of 50 mg./kg. These mice are then individually placed upon the top enclosed surface of a copper bath maintained at 59°±0.5° C. by a boiling acetone-ethyl acetate mixture. The response to this presumably painful heat stimulus is either a licking of the paws or an attempt to jump from the plate. The response time is measured four times for each mouse at fifteen minute intervals following administration. The criterion of analgesia is a 100% increase in response time over control. Established clinically active analgesics, such as Demerol, codeine, etc., are active in the above test.

When mixed with suitable excipients or diluents, they can be prepared as pills, capsules, tablets, powders, and the like for unit dosage and to simplify administration. As analgesics they will relieve pain by direct action on nerve centers or by diminishing the conductivity of the sensory nerve fibers.

The following examples are illustrative of the general methods of preparing the compounds listed in the table:

*Example 1*

A mixture of 9.9 parts of N-(meta-chlorophenyl)-N′,N′-dimethylethylenediamine and 25 parts by volume of propionic anhydride is heated on the steam bath for three hours and then distilled. The portion which distills at 140°–144° C. (2.5 mm.) is meta-chloro-N-(2-dimethylaminoethyl)-propionanilide. The yield is 52%.

The hydrochloride salt is prepared by the addition of alcoholic hydrogen chloride to the ether solution of the base. The hydrochloride melts at 125°–127° C.

*Example 2*

A mixture of 8.1 parts of N-(2-dimethylaminoethyl)-p-nitropropionanilide (prepared as in Example 1), 1 part of 5% palladium on carbon catalyst, and 80 parts of ethanol is shaken in a Parr Hydrogenator under about 3 atmospheres of hydrogen pressure for 20 minutes. The reaction mixture is filtered and the filtrate is concentrated and distilled. The portion which distills at 160°–165° C. (0.2 mm.) is N-(2-dimethylaminoethyl)-p-aminopropionanilide. The yield is 66%.

*Example 3*

A solution of 6.0 parts of N-(2-dimethylamino-1-methylethyl)-meta-hydroxyaniline in 25 parts by volume of alcohol is stirred, while 2.65 parts of propionyl chloride is added. The reaction mixture is left at room temperature for 16 hours and is then refluxed for 2 hours.

It is concentrated, treated with 30 parts of 1 N sodium hydroxide and extracted with ether. The ether layer is dried over magnesium sulfate and then distilled. N-(2-dimethylamino-1-methylethyl) - meta - hydroxy-propionanilide distills at 170°–190° C. (0.8 mm.).

Example 4

A mixture of 8.2 parts of N,N-dimethyl-N'-phenylethylenediamine and 20 parts of butyric anhydride is heated on the steam bath for three hours and then distilled. Pure N-(2-dimethylaminoethyl)-butyranilide is collected at 110°–115° C. (0.25 mm.). The yield is 50%.

A solution of 3.6 parts of the above oil in 9.6 parts by volume of 1.53 N alcoholic HCl is diluted with ether and cooled. A precipitate separates and is filtered, washed with ether, and dried. The yield of N-(2-dimethylaminoethyl)-butyranilide hydrochloride, melting point 132°–133° C., is 72%.

Example 5

A mixture of 8.9 parts of N,N-dimethyl-N'-(p-tolyl)-ethylenediamine and 20 parts of isobutyric anhydride is heated on the steam bath for 17 hours and then distilled. The portion which boils at 112°–115° C. (0.1 mm.) is N-(2-dimethylaminoethyl)-p-methyl-isobutyranilide. The yield is 77%.

A solution of 7.9 g. of the above product in 20 parts by volume of 1.53 N alcoholic HCl is diluted with ether and then cooled. The precipitate of N-(2-dimethylaminoethyl)-p-methylisobutyranilide hydrochloride is filtered, washed with ether, and dried, melting point 179°–180° C.

Example 6

A mixture of 9.6 parts of N,N-diethyl-N'-phenylethylenediamine and 25 parts by volume of valeric anhydride is heated on the steam bath for three hours and then distilled. The portion which boils at 142°–146° C. (1.5 mm.) is N-(2-diethylaminoethyl)-valeranilide.

Example 7

A mixture of 2.6 parts of N-(2-morpholinoethyl)-propionanilide and 1.8 parts by volume of 5.25 N nitric acid is concentrated to dryness and then triturated with ether. The crystals are filtered and then recrystallized from ethanol. The pure N-(2-morpholinoethyl)-propionanilide nitrate melts at 143°–144° C.

Example 8

A mixture of 11.6 parts of N-(2-anilinopropyl)-2-methylpiperidine and 25 parts by volume of propionic anhydride is heated on the steam bath for 3 hours and then distilled. N-[1-methyl - 2 - (2 - methylpiperidino)-ethyl]-propionanilide is collected at 130–134° C. (0.2 mm.).

Example 9

An equivalent amount of N-(2-anilinopropyl)-2-methylpyrrolidine substituted for N-(2-anilinopropyl)-2-methylpiperidine and reacted as described in Example 8, produces N-[1-methyl-2-(2 - methylpyrrolidino)-1-ethyl] propionanilide which is purified by distillation under reduced pressure.

Example 10

An equivalent amount of N-(2-anilinopropyl)-4-ethylpiperidine substituted for N-(2-anilinopropyl)-2-methylpiperidine and reacted as described in Example 8, produces N-[1-methyl-2-(4 - ethylpiperidino)ethyl]-propionanilide which is purified by distillation under reduced pressure.

Example 11

A mixture of 7.7 parts of N-(2-methylaminopropyl)-propionanilide, 4.8 parts of allyl bromide, 7 parts of pyridine, and 30 parts by volume of ethanol is heated for ten hours and then concentrated. The residue is diluted with water and the mixture is extracted with ether. The ether layer is dried over magnesium sulfate and then distilled. N-[2-(allylmethylamino)propyl]-propionanilide is collected at 108–110° C. (0.1 mm.).

Example 12

A solution of 22.5 parts of l-malic acid in 250 parts of ethanol is added to a solution of 46 parts of racemic N-(1-methyl-2-piperidinoethyl)-propionanilide in 250 parts of ethanol, and the mixture is cooled. The precipitate which separates is filtered, washed with ethanol and ether and then recrystallized three times from ethanol. Pure l-N-(1-methyl - 2 - piperidinoethyl) - propionanilide-l-malate, melting point 178.5–179.5° C. and $[\alpha]^{25}$ D—16.2° (2% in water) is obtained in 71% of the theoretical yield.

A mixture of 20.4 parts of the above product and 120 parts by volume of 1 N sodium hydroxide is extracted with ether, and the ether extracts are washed with a little water and dried over magnesium sulfate. The filtered ether solution is treated with 30 parts by volume of 2.1 N alcoholic hydrogen chloride, and a precipitate separates. The mixture is allowed to stand for two hours, and it is then filtered. The cake is washed with ether and then recrystallized once from a mixture of ethanol and ether. The overall yield of l-N-(1-methyl-2-piperidinoethyl)-propionanilide hydrochloride, melting point 202–203° C. and $[\alpha]^{25}$ D—18.9° (2% in water), is 38% of the theoretical.

The mother liquor from the first precipitation of l-N-(1-methyl - 2 - piperidinoethyl) - propionanilide - l - malate is concentrated to remove the solvent, treated with an excess of 2 N sodium hydroxide, and extracted with ether. The ether extracts are dried over anhydrous magnesium sulfate and then concentrated to remove the solvent. The oil is mixed with 11.5 parts of d-tartaric acid and 250 parts of ethanol and cooled. The precipitated d-N-(1 - methyl - 2 - piperidinoethyl) - propionanilide-d-tartrate is filtered, washed with ether, and recrystallized twice from ethanol. The yield of pure product, melting point 204.5–205.5° C. and $[\alpha]^{25}$ D+23.3° (2% in water), is 62% of the theoretical.

A mixture of 20.4 parts of the above product and 120 parts by volume of 1 N sodium hydroxide is extracted with ether, and the ether extracts are washed with a little water and dried over magnesium sulfate. The filtered ether solution is treated with 30 parts by volume of 2.1 N alcoholic hydrogen chloride, and a precipitate separates. The mixture is allowed to stand for two hours and is then filtered. The cake is washed with ether and then recrystallized once from a mixture of ethanol and ether. The overall yield of d-N-(1-methyl-2-piperidinoethyl)-propionanilide hydrochloride, melting point 202°–203° C. and $[\alpha]^{25}$ D+18.9° (2% in water) is 32% of the theoretical.

Example 13

A solution of 12.6 parts of d-tartaric acid in 190 parts of ethanol is added to a solution of 46 parts of racemic N-(1 - methyl - 2 - piperidinoethyl) - propionanilide in 250 parts of ethanol. The mixture is cooled, and the precipitate which separates is filtered and recrystallized three times from ethanol. The yield of d-N-(1-methyl-2-piperidinoethyl)-propionanilide-d - tartrate, melting point 204.5–205.5° C. and $[\alpha]^{25}$ D+23.2° (2% in water), is 71%. This is converted to d-N-(1-methyl-2-piperidinoethyl)-propionanilide hydrochloride as described above in Example 12.

The filtrate from the initial precipitation of d-N-(1-methyl-2-piperidinoethyl) - propionanilide - d - tartrate is concentrated to an oil, treated with an excess of dilute sodium hydroxide and extracted with ether. The ether extracts are dried over anhydrous magnesium sulfate and then concentrated to remove the solvent. The oil is mixed with 250 parts of ethanol and 11.5 parts of l-malic acid and cooled. The precipitate which separates is filtered and recrystallized three times from ethanol. The yield of *l*-N-(1-methyl - 2 - piperidinoethyl) - propionanilide-*l*-malate, melting point 178.5–179.5° C. and $[\alpha]^{25}$ D— 16.5° (2% in water), is 61% of the theoretical. This product is converted to *l*-N-(1-methyl-2-piperidinoethyl)-propionanilide hydrochloride as described above in Example 12.

We claim:

1. The compound N - (1 - methyl - 2 - piperidinoethyl)-propionanilide.
2. The compound N-(2-piperidinopropyl)-propionanilide.
3. The compound N-(2-diethylaminoethyl)-meta-chloropropionanilide.
4. The compound N-(2-dimethylaminoethyl) - para-methylisobutyranilide.
5. The compound N-[1-methyl-2-(2-methylpiperidino) ethyl]propionanilide.
6. The compound *l*-N-(1-methyl - 2 - piperidinoethyl)-propionanilide.
7. The compound *d*-N-(1-methyl - 2 - piperidinoethyl)-propionanilide.
8. A compound of the group consisting of those having the formula:

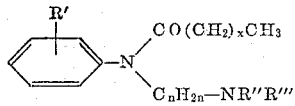

in which X is an integer of 1–3, R′ is a member of the group consisting of hydrogen, chloro, dichloro, bromo, hydroxyl, lower alkyl, lower alkoxy, lower alkanoyloxy, amino and lower alkanoylamino radicals, NR″R‴ is a member of the group consisting of diloweralkylamino, N-(lower alkyl)-allylamino, morpholino, methylpiperazinyl, piperidino, methylpiperidino, pyrrolidino and hexamethyleneimino, $n$ is an integer from 2 to 4, and non-toxic therapeutic acid addition salts thereof.

9. A compound having the formula:

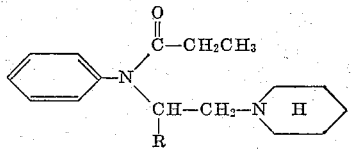

in which R is a lower alkyl radical.

References Cited in the file of this patent

UNITED STATES PATENTS 2,792,399      Ekenstam et al. _____ May 14, 1957